(12) United States Patent
S V et al.

(10) Patent No.: US 9,153,054 B2
(45) Date of Patent: Oct. 6, 2015

(54) METHOD, APPARATUS AND COMPUTER PROGRAM PRODUCT FOR PROCESSING OF IMAGES AND COMPRESSION VALUES

(71) Applicant: Nokia Corporation, Espoo (FI)

(72) Inventors: Basavaraja S V, Bangalore (IN); Veldandi Muninder, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 133 days.

(21) Appl. No.: 13/920,169

(22) Filed: Jun. 18, 2013

(65) Prior Publication Data

US 2014/0003739 A1    Jan. 2, 2014

(30) Foreign Application Priority Data

Jun. 27, 2012  (IN) .............. 2543/CHE/2012

(51) Int. Cl.
*G06K 9/36* (2006.01)
*G06T 11/60* (2006.01)
*G06K 9/46* (2006.01)
*G06K 9/62* (2006.01)
*H04N 19/172* (2014.01)
*H04N 19/13* (2014.01)
*H04N 19/91* (2014.01)
*H04N 19/136* (2014.01)
*H04N 19/179* (2014.01)

(52) U.S. Cl.
CPC .............. *G06T 11/60* (2013.01); *G06K 9/4604* (2013.01); *G06K 9/4671* (2013.01); *G06K 9/6232* (2013.01); *H04N 19/13* (2014.11); *H04N 19/136* (2014.11); *H04N 19/172* (2014.11); *H04N 19/179* (2014.11); *H04N 19/91* (2014.11)

(58) Field of Classification Search
USPC ......... 382/166, 190, 232, 233, 250–251, 284; 358/426.05, 426.12
See application file for complete search history.

(56) References Cited

U.S. PATENT DOCUMENTS

| | | | | |
|---|---|---|---|---|
| 5,187,592 | A  * | 2/1993  | Sugiyama et al. | 358/426.05 |
| 5,621,819 | A  * | 4/1997  | Hozumi | 382/232 |
| 6,272,255 | B2 * | 8/2001  | de Queiroz et al. | 382/239 |
| 7,260,275 | B2 * | 8/2007  | Shiraishi et al. | 382/284 |
| 8,023,689 | B2 * | 9/2011  | Roberts | 382/100 |
| 8,265,401 | B2 * | 9/2012  | Yoshimura | 382/232 |
| 8,577,169 | B2 * | 11/2013 | Andrus et al. | 382/274 |
| 2005/0063608 | A1 | 3/2005 | Clarke et al. | |

(Continued)

FOREIGN PATENT DOCUMENTS

JP    2001-016591 A    1/2001

OTHER PUBLICATIONS

Brown et al., "Automatic Panoramic Image Stitching using Invariant Features", International Journal of Computer Vision, vol. 74, Issue 1, Aug. 2007, 16 pages.

(Continued)

*Primary Examiner* — Amir Alavi
(74) *Attorney, Agent, or Firm* — Harrington & Smith

(57) ABSTRACT

In accordance with an example embodiment a method, apparatus and computer program product are provided. The method comprises facilitating receipt of a source image and compressing a plurality of images based on the source image. The plurality of images is associated with compression values generated on compression of the plurality of images. The method further comprises identifying an at least partially matching image to the source image from among the plurality of images based on the compression values.

17 Claims, 7 Drawing Sheets

(56) References Cited

U.S. PATENT DOCUMENTS

| | | |
|---|---|---|
| 2006/0195475 A1 | 8/2006 | Logan et al. |
| 2007/0053439 A1* | 3/2007 | Chen et al. ............... 375/240.24 |
| 2008/0192125 A1 | 8/2008 | Kang et al. |
| 2010/0239174 A1 | 9/2010 | Oh et al. |
| 2010/0246969 A1 | 9/2010 | Winder et al. |
| 2014/0003739 A1* | 1/2014 | S V et al. ...................... 382/284 |

OTHER PUBLICATIONS

Szeliski, "Image Alignment and Stitching: A Tutorial", Foundations and Trends in Computer Graphics and Vision, vol. 2, Issue 1, Jan. 2006, 105 pages.

Wu et al., "Compression of Concentric Mosaic With Rebinning of Slits (ROSS)", Research Paper, Dec. 2000, 4 pages.

Min et al., "Panorama Stitching Based on SIFT Algorithm and Levenberg-Marquardt Optimization", Physics Procedia, International Conference on Medical Physics and Biomedical Engineering, vol. 33, 2012, pp. 811-818.

Yue et al., "Cloud-Based Image Coding for Mobile Devices—Toward Thousands to One Compression", IEEE Transactions on Multimedia, vol. 15, Issue 4, Jun. 2013, pp. 845-857.

Extended European Search Report received for corresponding European Patent Application No. 13172013.8, dated Jan. 8, 2014, 9 pages.

\* cited by examiner

US 9,153,054 B2

METHOD, APPARATUS AND COMPUTER PROGRAM PRODUCT FOR PROCESSING OF IMAGES AND COMPRESSION VALUES

TECHNICAL FIELD

Various implementations relate generally to method, apparatus, and computer program product for processing of images.

BACKGROUND

The rapid advancement in technology related to capturing images has resulted in an exponential increase in the creation of image content. Devices like mobile phones and personal digital assistants (PDA) are now being increasingly configured with image capturing tools, such as a camera, thereby facilitating easy capture of the image content. The captured images may be subjected to processing based on various user needs. For example, images corresponding to a scene captured from various viewpoints and angles may have a high amount of overlapping image portions. Such images may be processed to generate a panorama image. A panorama image refers to an image with an extended field of view (for example, a wide-angle representation) beyond that can be captured by an image sensor. The processing of images may also help in retrieving relatively similar images or deleting duplicate images from a large collection of images and help streamline browsing and storing of the images.

SUMMARY OF SOME EMBODIMENTS

Various aspects of example embodiments are set out in the claims.

In a first aspect, there is provided a method comprising: facilitating receipt of a source image; compressing a plurality of images based on the source image, wherein the plurality of images are associated with compression values generated on compression of the plurality of images; and identifying an at least partially matching image to the source image from among the plurality of images based on the compression values.

In a second aspect, there is provided an apparatus comprising at least one processor; and at least one memory comprising computer program code, the at least one memory and the computer program code configured to, with the at least one processor, cause the apparatus to at least perform: facilitate receipt of a source image; compress a plurality of images based on the source image, wherein the plurality of images are associated with compression values generated on compression of the plurality of images; and identify an at least partially matching image to the source image from among the plurality of images based on the compression values.

In a third aspect, there is provided a computer program product comprising at least one computer-readable storage medium, the computer-readable storage medium comprising a set of instructions, which, when executed by one or more processors, cause an apparatus to at least perform: facilitate receipt of a source image; compress a plurality of images based on the source image, wherein the plurality of images are associated with compression values generated on compression of the plurality of images; and identify an at least partially matching image to the source image from among the plurality of images based on the compression values.

In a fourth aspect, there is provided an apparatus comprising: means for facilitating receipt of a source image; means for compressing a plurality of images based on the source image, wherein the plurality of images are associated with compression values generated on compression of the plurality of images; and means for identifying an at least partially matching image to the source image from among the plurality of images based on the compression values.

In a fifth aspect, there is provided a computer program comprising program instructions which when executed by an apparatus, cause the apparatus to: facilitate receipt of a source image; compress a plurality of images based on the source image, wherein the plurality of images are associated with compression values generated on compression of the plurality of images; and identify an at least partially matching image to the source image from among the plurality of images based on the compression values.

BRIEF DESCRIPTION OF THE FIGURES

Various embodiments are illustrated by way of example, and not by way of limitation, in the figures of the accompanying drawings in which.

DETAILED DESCRIPTION

Example embodiments and their potential effects are understood by referring to FIGS. 1 through 6B of the drawings.

Figure 1:
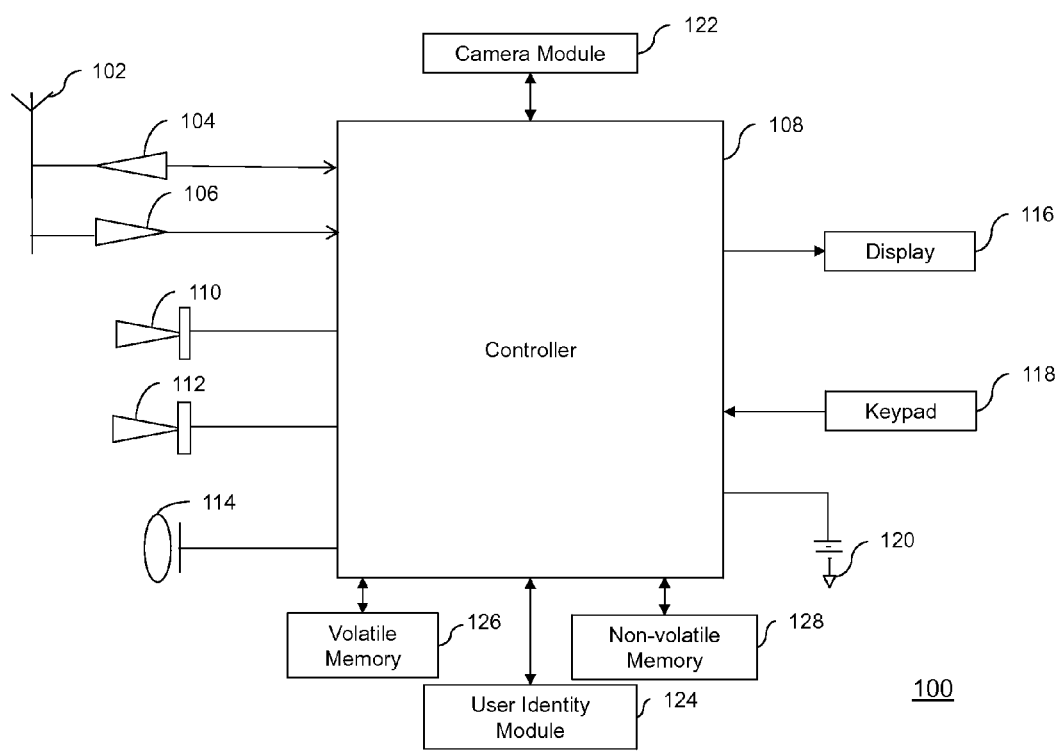
FIG. 1 illustrates a device in accordance with an example embodiment.

FIG. 1 illustrates a device 100 in accordance with an example embodiment. It should be understood, however, that the device 100 as illustrated and hereinafter described is merely illustrative of one type of device that may benefit from various embodiments, therefore, should not be taken to limit the scope of the embodiments. As such, it should be appreciated that at least some of the components described below in connection with the device 100 may be optional and thus in an example embodiment may include more, less or different components than those described in connection with the example embodiment of FIG. 1. The device 100 could be any of a number of types of mobile electronic devices, for example, portable digital assistants (PDAs), pagers, mobile televisions, gaming devices, cellular phones, all types of computers (for example, laptops, mobile computers or desktops), cameras, audio/video players, radios, global positioning system (GPS) devices, media players, mobile digital assistants, or any combination of the aforementioned, and other types of communications devices.

The device 100 may include an antenna 102 (or multiple antennas) in operable communication with a transmitter 104 and a receiver 106. The device 100 may further include an apparatus, such as a controller 108 or other processing device that provides signals to and receives signals from the transmitter 104 and receiver 106, respectively. The signals may include signaling information in accordance with the air interface standard of the applicable cellular system, and/or may also include data corresponding to user speech, received data and/or user generated data. In this regard, the device 100 may be capable of operating with one or more air interface standards, communication protocols, modulation types, and access types. By way of illustration, the device 100 may be capable of operating in accordance with any of a number of first, second, third and/or fourth-generation communication protocols or the like. For example, the device 100 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA1000, wideband CDMA (WCDMA) and time division-synchronous CDMA (TD-SCDMA), with 3.9G wireless communication protocol such as evolved-universal terrestrial radio access network (E-UTRAN), with fourth-generation (4G) wireless communication protocols, or the like. As an alternative (or additionally), the device 100 may be capable of operating in accordance with non-cellular communication mechanisms. For example, computer networks such as the Internet, local area network, wide area networks, and the like; short range wireless communication networks such as Bluetooth® networks, Zigbee® networks, Institute of Electric and Electronic Engineers (IEEE) 802.11x networks, and the like; wireline telecommunication networks such as public switched telephone network (PSTN).

The controller 108 may include circuitry implementing, among others, audio and logic functions of the device 100. For example, the controller 108 may include, but are not limited to, one or more digital signal processor devices, one or more microprocessor devices, one or more processor(s) with accompanying digital signal processor(s), one or more processor(s) without accompanying digital signal processor(s), one or more special-purpose computer chips, one or more field-programmable gate arrays (FPGAs), one or more controllers, one or more application-specific integrated circuits (ASICs), one or more computer(s), various analog to digital converters, digital to analog converters, and/or other support circuits. Control and signal processing functions of the device 100 are allocated between these devices according to their respective capabilities. The controller 108 thus may also include the functionality to convolutionally encode and interleave message and data prior to modulation and transmission. The controller 108 may additionally include an internal voice coder, and may include an internal data modem. Further, the controller 108 may include functionality to operate one or more software programs, which may be stored in a memory. For example, the controller 108 may be capable of operating a connectivity program, such as a conventional Web browser. The connectivity program may then allow the device 100 to transmit and receive Web content, such as location-based content and/or other web page content, according to a Wireless Application Protocol (WAP), Hypertext Transfer Protocol (HTTP) and/or the like. In an example embodiment, the controller 108 may be embodied as a multi-core processor such as a dual or quad core processor. However, any number of processors may be included in the controller 108.

The device 100 may also comprise a user interface including an output device such as a ringer 110, an earphone or speaker 112, a microphone 114, a display 116, and a user input interface, which may be coupled to the controller 108. The user input interface, which allows the device 100 to receive data, may include any of a number of devices allowing the device 100 to receive data, such as a keypad 118, a touch display, a microphone or other input device. In embodiments including the keypad 118, the keypad 118 may include numeric (0-9) and related keys (#, *), and other hard and soft keys used for operating the device 100. Alternatively or additionally, the keypad 118 may include a conventional QWERTY keypad arrangement. The keypad 118 may also include various soft keys with associated functions. In addition, or alternatively, the device 100 may include an interface device such as a joystick or other user input interface. The device 100 further includes a battery 120, such as a vibrating battery pack, for powering various circuits that are used to operate the device 100, as well as optionally providing mechanical vibration as a detectable output.

In an example embodiment, the device 100 includes a media capturing element, such as a camera, video and/or audio module, in communication with the controller 108. The media capturing element may be any means for capturing an image, video and/or audio for storage, display or transmission. In an example embodiment, the media capturing element is a camera module 122 which may include a digital camera capable of forming a digital image file from a captured image. As such, the camera module 122 includes all hardware, such as a lens or other optical component(s), and software for creating a digital image file from a captured image. Alternatively, or additionally, the camera module 122 may include the hardware needed to view an image, while a memory device of the device 100 stores instructions for execution by the controller 108 in the form of software to create a digital image file from a captured image. In an example embodiment, the camera module 122 may further include a processing element such as a co-processor, which assists the controller 108 in processing image data and an encoder and/or decoder for compressing and/or decompressing image data. The encoder and/or decoder may encode and/or decode according to a JPEG standard format or another like format. For video, the encoder and/or decoder may employ any of a plurality of standard formats such as, for example, standards associated with H.261, H.262/MPEG-2, H.263, H.264, H.264/MPEG-4, MPEG-4, and the like. In some cases, the camera module 122 may provide live image data to the display 116. In an example embodiment, the display 116 may be located on one side of the device 100 and the camera module 122 may include a lens positioned on the opposite side of the device 100 with respect to the display 116 to enable the camera module 122 to capture images on one side of the device 100 and present a view of such images to the user positioned on the other side of the device 100.

The device 100 may further include a user identity module (UIM) 124. The UIM 124 may be a memory device having a processor built in. The UIM 124 may include, for example, a subscriber identity module (SIM), a universal integrated circuit card (UICC), a universal subscriber identity module (USIM), a removable user identity module (R-UIM), or any other smart card. The UIM 124 typically stores information elements related to a mobile subscriber. In addition to the UIM 124, the device 100 may be equipped with memory. For example, the device 100 may include volatile memory 126, such as volatile random access memory (RAM) including a cache area for the temporary storage of data. The device 100 may also include other non-volatile memory 128, which may be embedded and/or may be removable. The non-volatile memory 128 may additionally or alternatively comprise an electrically erasable programmable read only memory (EEPROM), flash memory, hard drive, or the like. The memories may store any number of pieces of information, and data, used by the device 100 to implement the functions of the device 100.

Figure 2:
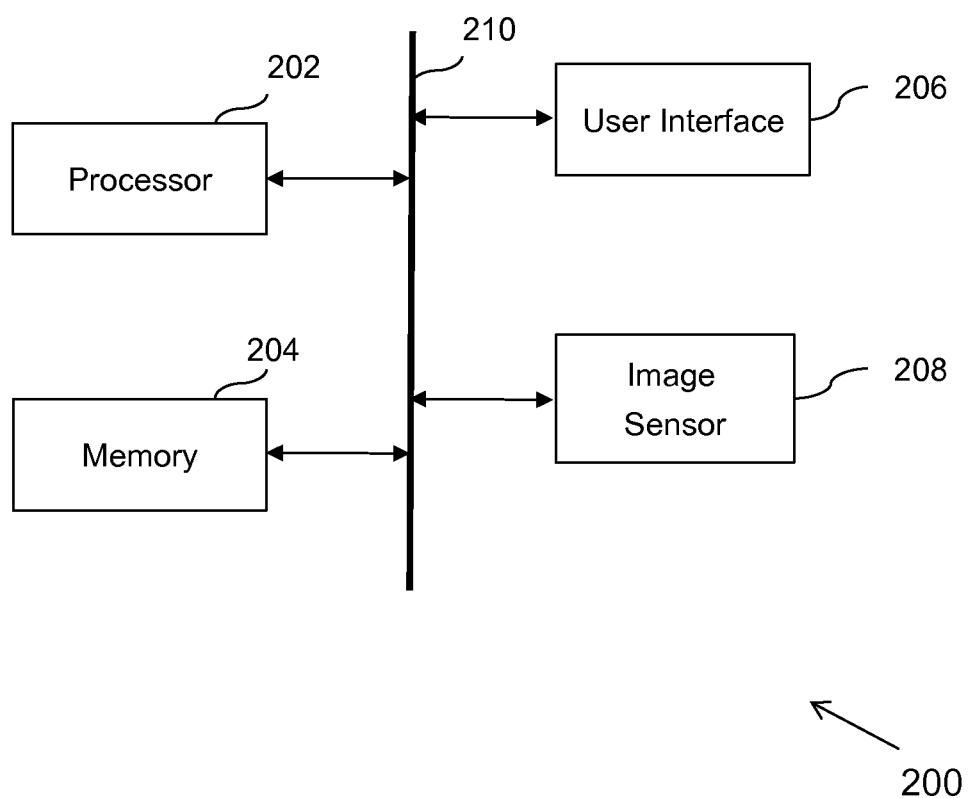
FIG. 2 illustrates an apparatus for processing of images in accordance with an example embodiment.

FIG. 2 illustrates an apparatus 200 for processing of images in accordance with an example embodiment. The apparatus 200 for processing of images may be employed, for example, in the device 100 of FIG. 1. However, it should be noted that the apparatus 200, may also be employed on a variety of other devices both mobile and fixed, and therefore, embodiments should not be limited to application on devices such as the device 100 of FIG. 1. Alternatively, embodiments may be employed on a combination of devices including, for example, those listed above. Accordingly, various embodiments may be embodied wholly at a single device, (for example, the device 100 or in a combination of devices). It should also be noted that the devices or elements described below may not be mandatory and thus some may be omitted in certain embodiments.

In an embodiment, the images may be captured by utilizing the camera module 122 of the device 100, and stored in the memory of the device 100. In an embodiment, the images may correspond to a same scene, or alternatively, the images may correspond to disparate scenes. The images may be stored in the internal memory such as hard drive, random access memory (RAM) of the apparatus 100 or in external storage medium such as digital versatile disk, compact disk, flash drive, memory card, or from external storage locations through Internet, Bluetooth®, and the like.

The apparatus 200 includes or otherwise is in communication with at least one processor 202 and at least one memory 204. Examples of the at least one memory 204 include, but are not limited to, volatile and/or non-volatile memories. Some examples of the volatile memory include, but are not limited to, random access memory, dynamic random access memory, static random access memory, and the like. Some example of the non-volatile memory includes, but are not limited to, hard disks, magnetic tapes, optical disks, programmable read only memory, erasable programmable read only memory, electrically erasable programmable read only memory, flash memory, and the like. The memory 204 may be configured to store information, data, applications, instructions or the like for enabling the apparatus 200 to carry out various functions in accordance with various example embodiments. For example, the memory 204 may be configured to buffer input data comprising multimedia content for processing by the processor 202. Additionally or alternatively, the memory 204 may be configured to store instructions for execution by the processor 202.

An example of the processor 202 may include the controller 108. The processor 202 may be embodied in a number of different ways. The processor 202 may be embodied as a multi-core processor, a single core processor; or combination of multi-core processors and single core processors. For example, the processor 202 may be embodied as one or more of various processing means such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an example embodiment, the multi-core processor may be configured to execute instructions stored in the memory 204 or otherwise accessible to the processor 202. Alternatively or additionally, the processor 202 may be configured to execute hard coded functionality. As such, whether configured by hardware or software methods, or by a combination thereof, the processor 202 may represent an entity, for example, physically embodied in circuitry, capable of performing operations according to various embodiments while configured accordingly. For example, if the processor 202 is embodied as two or more of an ASIC, FPGA or the like, the processor 202 may be specifically configured hardware for conducting the operations described herein. Alternatively, as another example, if the processor 202 is embodied as an executor of software instructions, the instructions may specifically configure the processor 202 to perform the algorithms and/or operations described herein when the instructions are executed. However, in some cases, the processor 202 may be a processor of a specific device, for example, a mobile terminal or network device adapted for employing embodiments by further configuration of the processor 202 by instructions for performing the algorithms and/or operations described herein. The processor 202 may include, among other things, a clock, an arithmetic logic unit (ALU) and logic gates configured to support operation of the processor 202.

A user interface 206 may be in communication with the processor 202. Examples of the user interface 206 include, but are not limited to, input interface and/or output user interface. The input interface is configured to receive an indication of a user input. The output user interface provides an audible, visual, mechanical or other output and/or feedback to the user. Examples of the input interface may include, but are not limited to, a keyboard, a mouse, a joystick, a keypad, a touch screen, soft keys, and the like. Examples of the output interface may include, but are not limited to, a display such as light emitting diode display, thin-film transistor (TFT) display, liquid crystal displays, active-matrix organic light-emitting diode (AMOLED) display, a microphone, a speaker, ringers, vibrators, and the like. In an example embodiment, the user interface 206 may include, among other devices or elements, any or all of a speaker, a microphone, a display, and a keyboard, touch screen, or the like. In this regard, for example, the processor 202 may comprise user interface circuitry configured to control at least some functions of one or more elements of the user interface 206, such as, for example, a speaker, ringer, microphone, display, and/or the like. The processor 202 and/or user interface circuitry comprising the processor 202 may be configured to control one or more functions of one or more elements of the user interface 206 through computer program instructions, for example, software and/or firmware, stored on a memory, for example, the at least one memory 204, and/or the like, accessible to the processor 202.

In an example embodiment, the apparatus 200 may include an electronic device. Some examples of the electronic device include communication device, media capturing device with communication capabilities, computing devices, and the like. Some examples of the communication device may include a mobile phone, a personal digital assistant (PDA), and the like. Some examples of computing device may include a laptop, a personal computer, and the like. In an example embodiment, the electronic device may include a user interface, for example, the UI 206, having user interface circuitry and user interface software configured to facilitate a user to control at least one function of the electronic device through use of a display and further configured to respond to user inputs. In an example embodiment, the electronic device may include a display circuitry configured to display at least a portion of the user interface of the electronic device. The display and display circuitry may be configured to facilitate the user to control at least one function of the electronic device.

In an example embodiment, the electronic device may be embodied as to include a transceiver. The transceiver may be any device operating or circuitry operating in accordance with software or otherwise embodied in hardware or a combination of hardware and software. For example, the processor 202 operating under software control, or the processor 202 embodied as an ASIC or FPGA specifically configured to perform the operations described herein, or a combination thereof, thereby configures the apparatus or circuitry to perform the functions of the transceiver. The transceiver may be configured to receive images. In an embodiment, the images correspond to a scene.

In an example embodiment, the electronic device may be embodied as to include an image sensor, such as an image sensor 208. The image sensor 208 may be in communication with the processor 202 and/or other components of the apparatus 200. The image sensor 208 may be in communication with other imaging circuitries and/or software, and is configured to capture digital images or to make a video or other graphic media files. The image sensor 208 and other circuitries, in combination, may be an example of the camera module 122 of the device 100. In certain example embodiments, the image sensor 208 may be external to the apparatus 200, but accessible and/or controlled by the apparatus 200.

These components (202-208) may communicate with each other via a centralized circuit system 210 for capturing of image and/or video content. The centralized circuit system 210 may be various devices configured to, among other things, provide or enable communication between the components (202-208) of the apparatus 200. In certain embodiments, the centralized circuit system 210 may be a central printed circuit board (PCB) such as a motherboard, main board, system board, or logic board. The centralized circuit system 210 may also, or alternatively, include other printed circuit assemblies (PCAs) or communication channel media.

In an example embodiment, the processor 202 is configured to, with the content of the memory 204, and optionally with other components described herein, to cause the apparatus 200 to facilitate receipt of a source image. In an embodiment, an image for use in processing a set of images (for example, images with or without overlapping image portions and/or regions) may be referred to as a source image. In an embodiment, the source image may be an image captured corresponding to a scene by a camera module 122 of device 100. The scene may include one or more objects in a surrounding environment of the apparatus 200, for example, a person or a gathering of individuals, birds, books, a playground, natural scenery, such as a mountain, and the like. In an embodiment, the source image may be received from the image sensor 208. It is noted that the image sensor 208 (or the camera module 122) may capture frames corresponding to the scene and the term 'frames' and 'images' have been used interchangeably herein. In an embodiment, multiple images corresponding to a scene may be captured by the image sensor 208. An initial image (for example, the image with the earliest timestamp) from among the captured images may be dynamically chosen as the source image. In an embodiment, a source image may be selected from among a collection of images either automatically or manually by user selection. In an embodiment, a user may provide a selection of the source image from among a collection of images, for example by using the user interface 206. In an embodiment, the source image may be received from an internal memory such as hard drive, random access memory (RAM) of the apparatus 200 or from an external storage medium such as digital versatile disk, compact disk, flash drive, memory card, or from external storage locations through Internet, Bluetooth®, and the like. The source image may also be received from the memory 204. In an example embodiment, a processing means may be configured to facilitate receipt of the source image. An example of the processing means may include the processor 202, which may be an example of the controller 108.

In an example embodiment, the processor 202 is configured to, with the content of the memory 204, and optionally with other components described herein, to cause the apparatus 200 to compress a plurality of images based on the source image. In an embodiment, the image sensor 208 may capture images corresponding to a scene from various angles and viewpoints. The various angles and viewpoints for capturing the images corresponding to the scene may be achieved by spanning the image sensor 208 in one or more directions. In an example embodiment, the image sensor 208 may be spanned through 360 degrees during image capture to obtain multiple images corresponding to the scene. The captured images may include overlapping image portions and/or regions on account of the images corresponding to the same scene being captured from different angles and viewpoints. The initial captured image from among the multiple images may be chosen as the source image whereas the remaining images of the multiple captured images may configure the plurality of images to be compressed based on the source image. It is noted that the source image and the plurality of images together configure the images captured by the image sensor 208 corresponding to the scene and comprise overlapping image portions and/or regions. In an embodiment, the source image may be chosen from a collection of images stored in an internal memory of the apparatus 200 or in the memory 204, and one or more images from the remaining images from the collection may configure the plurality of images to be compressed based on the source image. In an embodiment, the source image may be received from a user and the plurality of images may be received via network. Examples of the network may include a wired network, a wireless network and/or a combination thereof. Examples of the wired network include but are not limited to local area network, wide area network, Ethernet and the like. Examples of the wireless network include but are not limited to cellular network, Wi-Fi network, wireless LAN, Zigbee network and the like. An example of combination of the wired network and the wireless network may include but is not limited to the Internet. In an example embodiment, a processing means may be configured to compress the plurality of images based on the source image. An example of the processing means may include the processor 202, which may be an example of the controller 108.

In an example embodiment, compressing the plurality of images based on the source image comprises extracting features from the source image and quantizing the extracted features to create a plurality of codes corresponding to the source image. In an embodiment, the extracted features are capable of characterizing the source image. Examples of the feature points may include, but are not limited to, corners, edges of an image, or other region of interest such as background of the scene. In an example embodiment, the apparatus 200 may be caused to use algorithms such as scale-invariant feature transform (SIFT), Harris corner detector, smallest univalue segment assimilating nucleus (SUSAN) corner detector, features from accelerated segment test (FAST) for determining feature points associated with the source image. In an embodiment, extracting the features from the source image comprises applying a discrete cosine transform (DCT), a discrete sine transform (DST), a Karhunen-Loève theorem (KLT) transform or a Hadamard transform on macroblocks corresponding to the source image. In an example embodiment, the DCT is applied on macroblocks corresponding to the source image and the DC components thus obtained may be treated as features corresponding to the source image. In an embodiment, the DC components may be obtained by partially decoding the source image. On extracting the features of the source image, the features may be subjected to quantization, where each feature is scaled corresponding to a scale-down factor (also referred to as the quantization parameter) to generate an optimal set of plurality of codes. In an example embodiment, a processing means may be configured to extract features from the source image and quantize the extracted features to create the plurality of codes corresponding to the source image. An example of the processing means may include the processor 202, which may be an example of the controller 108.

In an embodiment, compressing the plurality of images based on the source image further comprises generating a compression table by compressing the source image based on the plurality of codes. In an embodiment, the source image is compressed using a lossless compression scheme for generating the compression table from the plurality of codes. In an embodiment, the lossless compression scheme is an arithmetic coding scheme, Huffman coding scheme, context coding scheme, Lempel-Ziv compression scheme or Lempel-Ziv-Welch (LZW) compression scheme. For example, the source image and the plurality of codes generated by quantizing the features corresponding to the source image may be provided as an input to LZW compression scheme, which may provide an output as the compression table. In an embodiment, the compression table may comprise a pattern of matrix of coefficients characterizing the source image. In an embodiment, the compression table is constructed by scanning in a plurality of directions. For example, in an embodiment the compression table may be constructed by scanning in non-orthogonal directions in addition to a horizontal direction and a vertical direction. In an example embodiment, a processing means may be configured to generate a compression table by compressing the source image based on the plurality of codes. An example of the processing means may include the processor 202, which may be an example of the controller 108.

In an embodiment, the plurality of images is compressed based on the generated compression table corresponding to the source image. As explained above, the compression table is generated based on compressing the source image based on the plurality of codes. The compression table and an image of the plurality of images may be provided as an input to a lossless compression scheme, such as the LZW compression scheme, to compress the image. The plurality of images may be compressed in a similar manner based on the generated compression table. In an embodiment, an image may be associated with a compression value generated on compression of the image based on the compression table. In an embodiment, the compression value may be configured to provide an indication of the extent of compression achieved based on the compression table corresponding to the source image. In an embodiment, a higher compression value corresponds to a higher similarity (for example, higher amount of overlapping image portions and/or regions) between the source image and the image subjected to compression. Similarly, a lower compression value corresponds to a fewer similarities (for example, lesser amount of overlapping image portions and/or regions) between the source image and the image subjected to compression. On performing compression of the plurality of images based on the source image, a plurality of compression values may be generated. In an embodiment, each image of the plurality of images may be associated with a compression value generated on compression of the each image. In an embodiment, one or more images of the plurality of images may be associated with compression values generated on compression of the one or more images. In an example embodiment, a processing means may be configured to compress the plurality of images based on the generated compression table corresponding to the source image. An example of the processing means may include the processor 202, which may be an example of the controller 108.

In an example embodiment, the processor 202 is configured to, with the content of the memory 204, and optionally with other components described herein, to cause the apparatus 200 to identify an at least partially matching image to the source image from among the plurality of images based on the compression values. As explained, the plurality of images may be compressed based on the source image and the compressed images may be associated with compression values. As the compression values provide an indication of the extent of compression achieved, the image with a highest compression value may be treated as the image to be at least partially matching image. For example, relatively similar, to the source image. In an embodiment, the at least partially matching image is identified based on the highest compression value from among the compression values. It is noted that the at least partially matching image may include overlapping image portions and/or regions with the source image to a degree higher than the remaining images from among the plurality of images. The identification of the at least partially matching image is further explained with an illustrative example as follows: multiple images may be captured corresponding to a scene from various viewpoints and angles. Such images may include overlapping image portions and/or regions. The first image, for example the image with the earliest timestamp from among the multiple images may be chosen as the source image while the remaining images may configure the plurality of images. The plurality of images may be compressed based on the source image, for example using the compression table, and compression values corresponding to the plurality of images generated. The image from among the plurality of images associated with the highest compression value may be identified as the at least partially matching image to the source image. In an example embodiment, a processing means may be configured to identify an at least partially matching image to the source image from among the plurality of images based on compression values. An example of the processing means may include the processor 202, which may be an example of the controller 108.

In an example embodiment, the processor 202 is configured to, with the content of the memory 204, and optionally with other components described herein, to cause the apparatus 200 to select the identified at least partially matching image as a next source image and compress remaining images (for example, images excluding the next source image) of the plurality of images based on the next source image. In an embodiment, the processor 202 is configured to, with the content of the memory 204, and optionally with other components described herein, to cause the apparatus 200 to identify an at least partially matching image to the next source image from among the remaining images based on the compression values. As explained above, the plurality of images are compressed based on the source image and compression values are generated for the plurality of images. Based on the compression values, an at least partially matching image is identified for the source image. On identification of the at least partially matching image, the identified image is selected as a next source image. The remaining images of the plurality of images, for example, the plurality of images excluding the identified image, may then be compressed based on the next source image. The compression may be performed as explained for the source image. More specifically, the features may be extracted from the next source image and quantized to generate a plurality of codes corresponding to the next source image. The next source image may then be compressed based on the plurality of codes (for example, using a lossless compression scheme, such as the LZW compression scheme) to generate a compression table. The remaining images may be compressed based on the compression table corresponding to the next source image to generate compression values corresponding to the remaining images. An image associated with the highest compression value from among the compression values may be identified as an at least partially matching image to the next source image.

In an example embodiment, at least partially matching images are identified for the remaining images of the plurality of images. For example, the identified image may then be selected as a next source image and an at least partially matching image identified from among the remaining images, for example, the plurality of images excluding the next source image and the images for which at least partially matches have been previously identified. The steps of selecting, compressing and identifying may be performed till at least partially matching images are identified for the remaining images of the plurality of images. In an example embodiment, a processing means may be configured to: select the at least partially matching image as a next source image, compress remaining images of the plurality of images based on the next source image, and identify an at least partially matching image to the next source image from among the remaining images based on the compression values. In an example embodiment, a processing means may be configured to identify at least partially matching images for the remaining images of the plurality of images. An example of the processing means may include the processor 202, which may be an example of the controller 108.

In an example embodiment, the processor 202 is configured to, with the content of the memory 204, and optionally with other components described herein, to cause the apparatus 200 to determine a spatial order of the source image and the plurality of images based on the identified at least partially matching images for the source image and the plurality of images. It is noted that the plurality of images includes the next source image and the remaining images as explained above. Further, as explained in the illustrative example, multiple images corresponding to a scene may be captured by spanning an image sensor, such as the image sensor 208, through various viewpoints and angles. The multiple images captured in such a manner may be considered as spatially adjacent images and an spatial order of the captured images may be determined by identifying at least partially matching images for the source image and the plurality of images. The at least partially matching image identified for the source image may be considered to spatially adjacent image (for example, a neighboring image) to the source image on account of having highest amount of overlapping image portions and/or regions. The at least partially matching images identified for the plurality of images similarly identify spatially adjacent images to each of those images, thereby enabling determining a spatial order of the captured images.

In an embodiment, the compression values corresponding to the images compressed based on the source image and/or the next source images may be stored for enabling determination of the spatial order. For example, the compression values generated on compression of the plurality of images based on the source image may be represented by equation (1) as:

$$C(t=1)=\{Cs_2, Cs_3, \ldots, Cs_k, \ldots, Cs_n\} \quad (1)$$

Where t corresponds to the iteration reference number. For example, for the source image, a value of t may be equal to 1 as shown in equation (1). For the subsequently selected next source image, the value of t may be equal to 2. The values $Cs_2$, $Cs_3$, ..., $Cs_k$, ..., $Cs_n$ may correspond to generated compression values associated with images 2, 3, K and N respectively, when compressed based on the source image. In an embodiment, the highest compression value may be identified by equation (2) as:

$$\arg\max(C)=Cs_k \quad (2)$$

Where argmax is a function for identifying the maximum (for example, the highest) value among the compression values. If $Cs_k$ is the highest compression value from among the compression values, then associated image K may be identified as the at least partially matching image to the source image. The highest compression value may be removed from the set of compression values depicted by equation (1). For example, C' (1) may be configured by removing argmax $(C)=Cs_k$ from C(1). Similarly, C(2 to N) may be obtained, on identification of the at least partially matching images, the compression values corresponding to the remaining images may be stored, for example in memory 204. In an embodiment, determining the spatial order of the plurality of images comprises comparing compression values of an image on compression based on the source image and selected next source images. For example, if image number 1 is the source image and images numbered 2, 3 and 4 are the selected next source images (for example, at least partially matching images to previous selected source images), then on determining image number 5 to be at least partially matching to image number 4, a compression value of the image number 5 when compressed based on image number 4 is compared with compressions values when the image number 5 was compressed based on image numbers 1, 2 and 3 and 4. Based on the comparison the spatial order of image number 5 is determined. The determination of the spatial order of the source image and the plurality of images is further explained in FIG. 4. In an example embodiment, a processing means may be configured to determine a spatial order of the source image and the plurality of images based on the identified at least partially matching images for the source image and the plurality of images. An example of the processing means may include the processor 202, which may be an example of the controller 108.

In an example embodiment, the processor 202 is configured to, with the content of the memory 204, and optionally with other components described herein, to cause the apparatus 200 to generate a panorama image based at least on stitching the source image and the plurality of images arranged in the determined spatial order. As described herein, the term 'panorama image' refers to an image associated with a wider or elongated field of view. A panorama image may include a two-dimensional (2-D) construction of a three-dimensional (3-D) scene. In some embodiments, the panorama image may provide about 360 degrees view of the scene. In an embodiment, on determining the spatial order, the source image and the plurality of images may be arranged in the spatial order as spatially adjacent images and stitched (for example, combined) to generate the panorama image.

In an example embodiment, the processor 202 is configured to, with the content of the memory 204, and optionally with other components described herein, to cause the apparatus 200 to perform at least one of a feature extraction and a registration across the source image and the plurality of images prior to stitching the source image and the plurality of images arranged in the determined spatial order. In an example embodiment, the feature extraction and registration may be performed across an image (for example, source image or next source image) and the corresponding at least partially matching image. The feature extraction of an image and at least partially matching image may be performed using algorithms such as scale-invariant feature transform (SIFT), Harris corner detector, smallest univalue segment assimilating nucleus (SUSAN) corner detector, features from accelerated segment test (FAST). Alternatively, extracting the features may be performed by applying one of DCT, DST, KLT transform and a Hadamard transform on macroblocks corresponding to the image and the corresponding at least partially matching image. In an example embodiment, the DCT is applied on macroblocks corresponding to the image and the corresponding at least partially matching image and the DC components thus obtained may be treated as features. In an embodiment, the DC components may be obtained by partially decoding the source image and the plurality of images.

In an embodiment, registration may refer to process wherein object motion may be separated from motion of media capture medium and all background pixels may be made static in a common image frame. In an embodiment, the registration may be performed to align similar content across an image (for example, source image or next source image) and the corresponding at least partially matching image and remove jitter introduced either on account of movement of media capture medium (e.g., from being handheld) or account of transient environmental conditions, such as high wind conditions, during the capture of the multimedia content. Two-dimensional (2D) and three-dimensional (3D) image stabilization algorithms may be employed for performing the registration. In an embodiment, the 2D algorithms may estimate camera motion in the 2D image plane motion and zoom or crop to compensate. The motion may be evaluated in a variety of ways, including optical flow, stable feature points, and block-based cross-correlation. In an embodiment, 3D video stabilization algorithms may identify stable 3D feature points by structure-from-motion and apply image based or warping techniques to cope with parallax effect.

In an example embodiment, the stitching the source image and the plurality of images arranged in the determined spatial order may involve performing at least one of warping and blending of images to generate the panorama image. Warping, for example alignment, may be performed in order to obtain an image in view of other image. This may be done as the two images, even though capturing the same scene may capture the information with slight difference on account of difference in an angle of capture. Accordingly, alignment of pixels may be performed to obtain the view of one image in terms of other image. Accordingly, a warp may be computed to obtain one image in the view of the other image. In some embodiments, warping may involve performing interpolation for example, bilinear interpolation. In an example embodiment, the warp may be computed as an 8 parameter transform (for example, using standard techniques, such as similarity, homography, affine and the like) or may be computed using a dense correspondence computed for a stereo camera. In an example embodiment, the warped images may be stitched by computing a seam between the images and blending the images across the seam. The image blending techniques may involve cross-fading or morphing across transitions. The identification of the at least partially matching image for facilitating applications, such as panorama image generation is further explained in FIG. 3.

Figure 3:
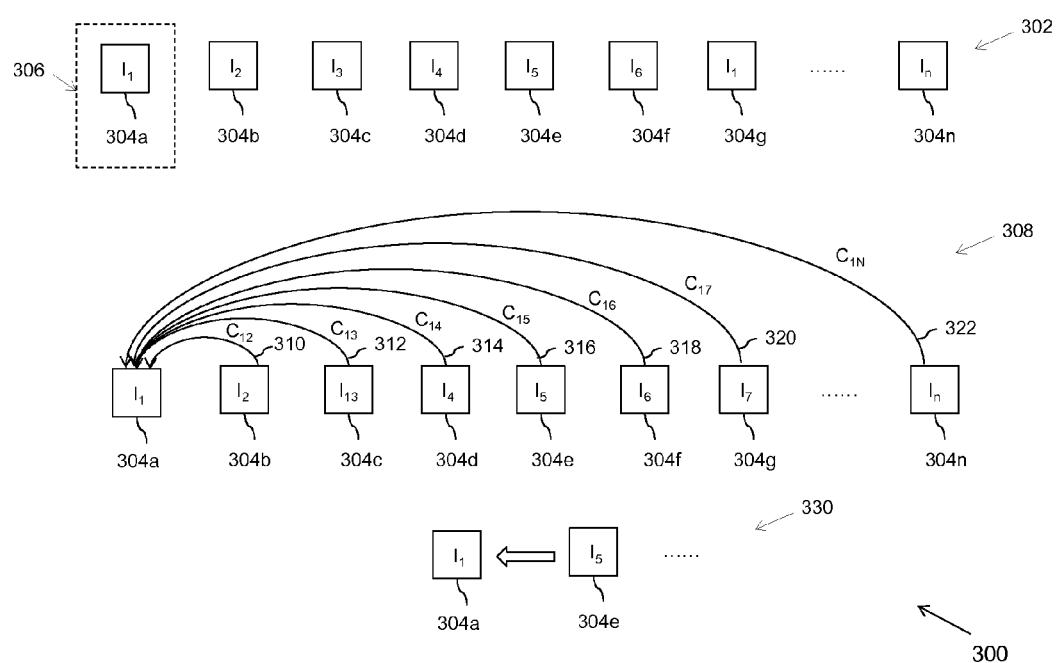
FIG. 3 illustrates a simplified logical overview for identifying an at least partially matching image in accordance with an example embodiment.
Figure 4:
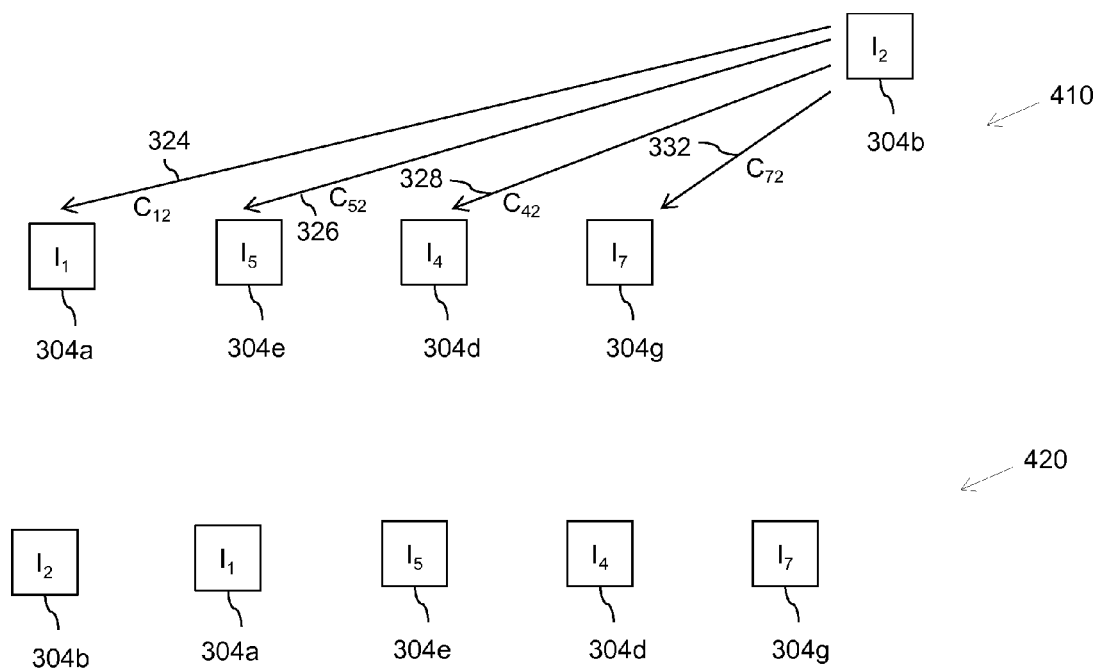
FIG. 4 illustrates determination of a spatial order of images for panorama image generation in accordance with an example embodiment.

FIG. 3 illustrates a simplified logical overview 300 for identifying an at least partially matching image in accordance with an example embodiment. At 302, multiple images such as images 304a, 304b, 304c, 304d, 304e, 304f, 304g to 304n (depicted as images $I_1$-$I_n$) are received. In an embodiment, the multiple images may correspond to a scene captured by an image sensor, such as the image sensor 208, by spanning through various viewpoints and angles. Accordingly, the multiple images may include overlapping image portions corresponding to the scene. The image with the initial timestamp may be chosen dynamically to be the first image. At 306, the first image from among the multiple images may be chosen as the source image. In FIG. 4, the image 304a is depicted to be chosen as the source image at 306. The remaining images 304b-304n may configure the plurality of images for purposes of this illustration. In an embodiment, a user may provide the selection of source image 304a from among collection of images. The remaining images in the collection of images, for example images 304b-304n, may configure the plurality of images. In an embodiment, the plurality of images may be sourced from the network, such as the network explained in FIG. 2, on provision of the source image 304a by a user.

At 308, the plurality of images is compressed based on the source image 304a. As explained in FIG. 2, features may be extracted from the source image 304a and the extracted features may be quantized to generate a plurality of codes corresponding to the source image 304a. The source image 304a may be compressed based on the plurality of codes using a lossless compression scheme, such as LZW, to generate a compression table. The plurality of images may be compressed corresponding to the source image 304a using the generated compression table. On compression, each image of the plurality of images may be associated with a compression value. The compression value may be indicative of the extent of compression achieved on compression based on the source image 304a. In FIG. 3, the curved arrows 310-322 depict relation between images, for example a compression of an image of the plurality of images based on the source image 304a, whereas a value depicted to be associated with each curved arrow corresponds to a generated compression value. For example, curved arrow 310 depicts compression of image 304b (for example, image $I_2$) based on image 304a and '$C_{12}$' is a generated compression value associated with image 304b on compression based on image 304a. Similarly, curved arrows 312, 314, 316, 318, 320 and 322 depict compression of images 304c, 304d, 304e, 304f, 304g and 304n based on source image 304a, respectively. The compression values '$C_{13}$', '$C_{14}$', '$C_{15}$', '$C_{16}$', '$C_{17}$' and '$C_{1n}$' correspond to compression values generated for images 304c, 304d, 304e, 304f, 304g to 304n on compression based on the source image 304a.

In an embodiment, the compression values associated with the images 304b-304n may be compared and an image among the plurality of images with the highest compression value among the compression values $C_{12}$ ... -$C_{1n}$ may be identified as at least partially matching image to source image 304a. In an embodiment depicted by FIG. 3, compression value $C_{15}$ is considered to be the highest compression value among the compression values $C_{12}$-$C_{1n}$. Accordingly, image 304e (for example, image $I_5$) is identified as at least partially matching image to the source image 304a at 330. As explained in FIG. 2, a higher compression value corresponds to a higher similarity (for example, higher amount of overlapping image portions and/or regions) between the source image and the image subjected to compression, while a lower compression value corresponds to a fewer similarities (for example, lesser amount of overlapping image portions and/or regions) between the source image and the image subjected to compression. In FIG. 3, image 304e has the highest compression value from among the compression values associated with the plurality of images and accordingly is considered to be at least partially matching, relatively similar to the source image 304a. The identification of the at least partially matching image in such a manner may facilitate enablement of a variety of applications. For example, a user may provide the choice of a source image and identify a closest matching match from the web. In an embodiment, identifying at least partially matching images may help in retrieving similar images from a large collection of images or help remove duplicates thereby facilitating faster browsing and better utilization of storage space.

In an embodiment, on identification of image 304e as at least partially matching image to the source image 304a, the image 304e is selected as the next source image and remaining images, for example images 304b to 304n excluding image 304e, are compressed based on image 304e to identify at least partially matching image to the next source image 304e. The steps of selecting the next source image, compressing the remaining images based on the next source image and identifying the at least partially matching image may be repeated till at least partially matching images are identified for the plurality of image 304b-304n. A spatial order of the images may be determined for generating the panorama image based on identified at least partially matching images for the source image 304a and the plurality of images 304b-304n. The determination of the spatial order is explained in FIG. 4.

FIG. 4 illustrates determination of a spatial order of images for panorama image generation in accordance with an example embodiment. In FIG. 4, determination of spatial order of an image from among the multiple images 304a-304n of FIG. 3 is depicted for illustration purposes. As explained in FIG. 3, at least partially matching images are identified for the source image 304a and the plurality of images. In an embodiment, the spatial order may be determined subsequent to determination of the at least partially matching image for the source image 304a and the plurality of images 304n. Alternatively, a spatial position of image may be determined in an on-going manner and subsequent to identification of the image as the at least partially matching image. In FIG. 4, the spatial position of the image is depicted to be determined subsequent to the identification of the image as the at least partially matching image. It is noted that determining the spatial position of images of the plurality of images determines the spatial order and thereby facilitates in generation of the panorama image. In an embodiment, the determination of the spatial order and the subsequent panorama image generation may be performed if it is determined that the source image and the plurality of images include at least 20% overlapping image portions and/or regions. In some embodiments, the panorama generation may be performed even if it is determined that the source image and the plurality of images include less than 20% overlapping image portions and/or regions In FIG. 4, at 410, images 304a, 304e, 304d and 304g are depicted to arranged in their respective spatial positions. On selection of the image 304g as the next source image, remaining images from the plurality of images may be compressed to identify the at least partially matching image to image 304g. In FIG. 4, image 304b is depicted to be identified as the at least partially matching image to image 304g. On identification, a compression value associated with the image 304b for compression based on image 304g, for example compression value $C_{72}$ (for example, compression value depicted to be associated with arrow 332 illustrating compression of image 304b based on images 304g)), is compared with compression values $C_{12}$, $C_{52}$ and $C_{42}$ (for example, compression values depicted to be associated with arrows 324, 326 and 328 illustrating compression of image 304b based on images 304a, 304e and 304d) and accordingly the spatial position of image 304b is determined. It is noted that the compression values $C_{12}$, $C_{52}$ and $C_{42}$ were computed during compression of images for previously selected source image/next source images. For example, $C_{12}$ was computed during compression of plurality of images based on source image 304a, while $C_{52}$ and $C_{42}$ were computed during compression of remaining images based on images 304e and 304d respectively. In an embodiment, on compressing images and identifying an image with the highest compression value, the remaining compression values may be stored for facilitating determination of the spatial order. The storing of the remaining compression values may be performed as explained in FIG. 2.

In the embodiment depicted in FIG. 4, $C_{12}$ is considered to be greater than $C_{72}$ implying a higher amount of overlap between images 304a and image 304b than between images 304g and 304b. For example, an overlap between image images 304a and 304b may be 40% implying 40% overlapping image portions and/or regions while an overlap between images 304g and 304b may be 30%. Accordingly, a spatial position of the image 304b may be determined to be adjacent to image 304a as depicted in the spatial order at 420. It is noted that the spatial position may be closer to an image with which the image has a maximum overlap. Further it is noted that a compression value between images 304a and 304b though greater than the compression value between images 304g and 304b may not be highest and accordingly image 304e was initially chosen to be at least partially matching to image 304a.

It is noted that FIG. 4, depicts a single row (1-D) construction of the order for panorama image generation. In an embodiment, the panorama image generation may include both horizontal and vertical translations and accordingly, the spatial order determination may include determining a spatial position of images on left/right as well as top and bottom sides of images. On determining the spatial order, the source image and the plurality of images may be arranged in spatial order. As explained in FIG. 2, feature extraction and registration may be performed between an image and corresponding at least partially matching image prior to warping and blending the images for panorama generation. A method for processing of images is explained in FIG. 5.

Figure 5:
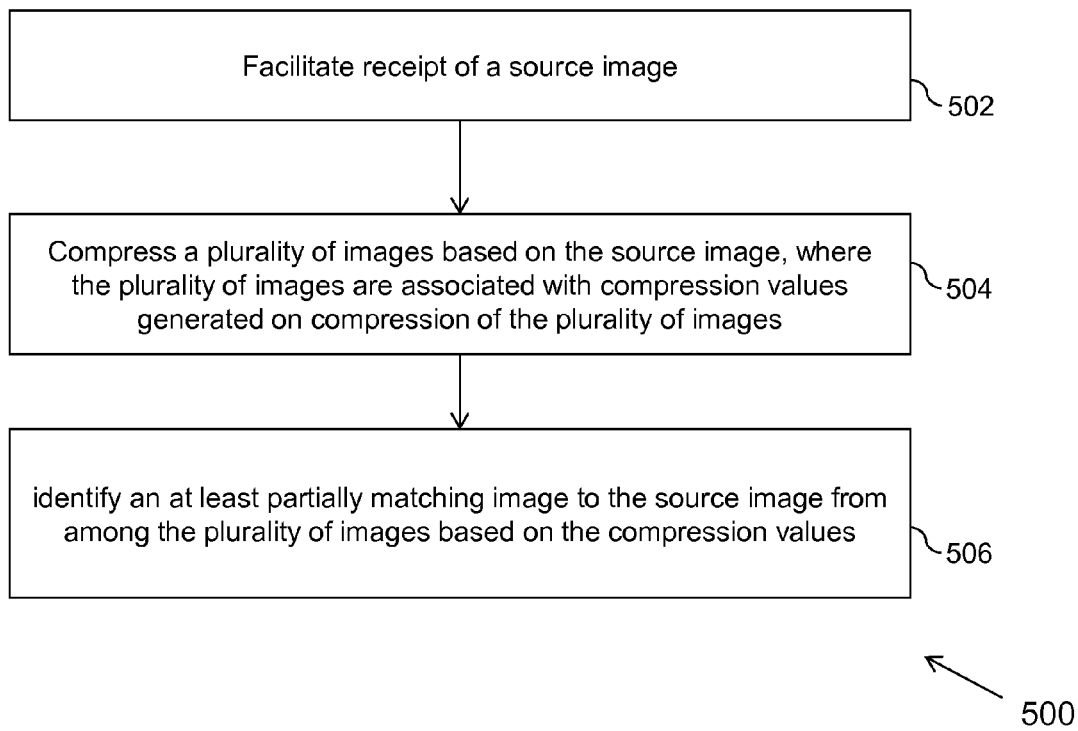
FIG. 5 is a flowchart depicting an example method for processing of images in accordance with an example embodiment.

FIG. 5 is a flowchart depicting an example method 500 for processing of images in accordance with an example embodiment. The method 500 depicted in flow chart may be executed by, for example, the apparatus 200 of FIG. 2. Operations of the flowchart, and combinations of operation in the flowchart, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of an apparatus and executed by at least one processor in the apparatus. Any such computer program instructions may be loaded onto a computer or other programmable apparatus (for example, hardware) to produce a machine, such that the resulting computer or other programmable apparatus embody means for implementing the operations specified in the flowchart. These computer program instructions may also be stored in a computer-readable storage memory (as opposed to a transmission medium such as a carrier wave or electromagnetic signal) that may direct a computer or other programmable apparatus to function in a particular manner, such that the instructions stored in the computer-readable memory produce an article of manufacture the execution of which implements the operations specified in the flowchart. The computer program instructions may also be loaded onto a computer or other programmable apparatus to cause a series of operations to be performed on the computer or other programmable apparatus to produce a computer-implemented process such that the instructions, which execute on the computer or other programmable apparatus provide operations for implementing the operations in the flowchart. The operations of the method 500 are described with help of apparatus 200 of FIG. 2. However, the operations of the method can be described and/or practiced by using any other apparatus.

At block 502 of method 500, receipt of a source image is facilitated. In an embodiment, an image for use in processing a set of images (for example, images with or without overlapping image portions and/or regions) may be referred to as a source image. In an embodiment, the source image may be an image captured corresponding to a scene by a media capture element, such as a camera module 122 of device 100 or the image sensor 208. The scene may include one or more objects in a surrounding environment of the media capture element, for example, a person or a gathering of individuals, birds, books, a playground, natural scenery, such as a mountain, and the like. In an embodiment, multiple images corresponding to a scene may be captured by an image sensor. An initial image (for example, the image with the earliest timestamp) from among the captured images may be dynamically chosen as the source image. In an embodiment, a source image may be selected from among a collection of images either automatically or manually by user selection. In an embodiment, a user may provide a selection of the source image from among a collection of images, for example by using a user interface, such as the user interface 206. In an embodiment, the source image may be received from an internal memory such as hard drive, random access memory (RAM) or from an external storage medium such as digital versatile disk, compact disk, flash drive, memory card, or from external storage locations through Internet, Bluetooth®, and the like.

At block 504, a plurality of images is compressed based on the source image. In an embodiment, the image sensor may capture images corresponding to a scene from various angles and viewpoints. The various angles and viewpoints for the capturing the images corresponding to the scene may be achieved by spanning the image sensor in one or more directions. In an example embodiment, the image sensor may be spanned through 360 degrees during image capture to obtain multiple images corresponding to the scene. The captured images may include overlapping image portions and/or regions on account of the images corresponding to the same scene being captured from different angles and viewpoints. The initial captured image from among the multiple images may be chosen as the source image whereas the remaining images of the multiple captured images may configure the plurality of images to be compressed based on the source image. It is noted that the source image and the plurality of images together configure the images captured by the image sensor corresponding to the scene and comprise overlapping image portions and/or regions. In an embodiment, the source image may be chosen from a collection of images stored in memory location, and one or more images from the remaining images from the collection may configure the plurality of images to be compressed based on the source image. In an embodiment, the source image may be received from a user and the plurality of images may be received via network. Examples of the network may include a wired network, a wireless network and/or a combination thereof. Examples of the wired network include but are not limited to local area network, wide area network, Ethernet and the like. Examples of the wireless network include but are not limited to cellular network, Wi-Fi network, wireless LAN, Zigbee network and the like. An example of combination of the wired network and the wireless network may include but is not limited to the Internet.

In an example embodiment, compressing the plurality of images based on the source image comprises extracting features from the source image and quantizing the extracted features to create a plurality of codes corresponding to the source image. In an embodiment, the extracted features are capable of characterizing the source image. Examples of the feature points may include, but are not limited to, corners, edges of an image, or other region of interest such as background of the scene. In an example embodiment, the apparatus 200 may be caused to use algorithms such as scale-invariant feature transform (SIFT), Harris corner detector, smallest univalue segment assimilating nucleus (SUSAN) corner detector, features from accelerated segment test (FAST) for determining feature points associated with the source image. In an embodiment, extracting the features from the source image comprises applying a discrete cosine transform (DCT), a discrete sine transform (DST), a Karhunen-Loève theorem (KLT) transform or a Hadamard transform on macroblocks corresponding to the source image. In an example embodiment, the DCT is applied on macroblocks corresponding to the source image and the DC components thus obtained may be treated as features corresponding to the source image. In an embodiment, the DC components may be obtained by partially decoding the source image. On extracting the features of the source image, the features may be subjected to quantization, where each feature is scaled corresponding to a scale-down factor (also referred to as the quantization parameter) to generate an optimal set of plurality of codes.

In an embodiment, compressing the plurality of images based on the source image further comprises generating a compression table by compressing the source image based on the plurality of codes. In an embodiment, the source image is compressed using a lossless compression scheme for generating the compression table from the plurality of codes. In an embodiment, the lossless compression scheme is an arithmetic coding scheme, Huffman coding scheme, context coding scheme, Lempel-Ziv compression scheme or Lempel-Ziv-Welch (LZW) compression scheme. For example, the source image and the plurality of codes generated by quantizing the features corresponding to the source image may be provided as an input to LZW compression scheme, which may provide an output as the compression table. In an embodiment, the compression table may comprise a pattern of matrix of coefficients characterizing the source image. In an embodiment, the compression table is constructed by scanning in a plurality of directions. For example, in an embodiment the compression table may be constructed by scanning in non-orthogonal directions in addition to a horizontal direction and a vertical direction.

In an embodiment, the plurality of images is compressed based on the generated compression table corresponding to the source image. As explained above, the compression table is generated based on compressing the source image based on the plurality of codes. The compression table and an image of the plurality of images may be provided as an input to a lossless compression scheme, such as the LZW compression scheme, to compress the image. The plurality of images may be compressed in a similar manner based on the generated compression table. In an embodiment, an image may be associated with a compression value generated on compression of the image based on the compression table. In an embodiment, the compression value may be configured to provide an indication of the extent of compression achieved based on the compression table corresponding to the source image. In an embodiment, a higher compression value corresponds to a higher similarity (for example, higher amount of overlapping image portions and/or regions) between the source image and the image subjected to compression. Similarly, a lower compression value corresponds to a fewer similarities (for example, lesser amount of overlapping image portions and/or regions) between the source image and the image subjected to compression. On performing compression of the plurality of images based on the source image, a plurality of compression values may be generated. In an embodiment, each image of the plurality of images may be associated with a compression value generated on compression of the each image. In an embodiment, one or more images of the plurality of images may be associated with compression values generated on compression of the one or more images.

At block 506, an at least partially matching image is identified to the source image from among the plurality of images based on compression values. As explained, the plurality of images may be compressed based on the source image and the compressed images may be associated with compression values. As the compression values provide an indication of the extent of compression achieved, the image with the highest compression value may be treated as the image to be at least partially matching image, for example relatively similar, to the source image. In an embodiment, the at least partially matching image is identified based on a highest compression value from among the compression values. It is noted that the at least partially matching image may include overlapping image portions and/or regions with the source image to a degree higher than the remaining images from among the plurality of images. The identification of the at least partially matching image may be performed as explained in FIG. 3.

In an example embodiment, method 500 may further include selecting the at least partially matching image as a next source image, compressing remaining images of the plurality of images based on the next source image, and identifying an at least partially matching image to the next source image from among the remaining images based on the compression values. As explained above, the plurality of images are compressed based on the source image and compression values are generated for the plurality of images. Based on the compression values, an at least partially matching image is identified for the source image. On identification of the at least partially matching image, the identified image is selected as a next source image. The remaining images of the plurality of images, for example, the plurality of images excluding the identified image, may then be compressed based on the next source image. The compression may be performed as explained for the source image. More specifically, the features may be extracted from the next source image and quantized to generate a plurality of codes corresponding to the next source image. The next source image may then be compressed based on the plurality of codes (for example, using a lossless compression scheme, such as the LZW compression scheme) to generate a compression table. The remaining images may be compressed based on the compression table corresponding to the next source image to obtain compression values corresponding to the remaining images. An image with the highest compression value from among the compression values may be identified as an at least partially matching image to the next source image.

In an example embodiment, at least partially matching images are identified for the remaining images of the plurality of images. For example, the identified image may then be selected as a next source image and an at least partially matching image identified from among the remaining images, for example, the plurality of images excluding the next source image and the images for which at least partially matches have been previously identified. The steps of selecting, compressing and identifying may be performed till at least partially matching images are identified for the remaining images of the plurality of images.

In an example embodiment, the method 500 may further include determining a spatial order of the source image and the plurality of images based on the identified at least partially matching images for the source image and the plurality of images. It is noted that the plurality of images includes the next source image and the remaining images as explained above. The spatial order may be determined as explained in FIG. 4. In an example embodiment, a panorama image may be generated based at least on stitching the source image and the plurality of images arranged in the determined spatial order. In an example embodiment, at least one of a feature extraction and a registration across the source image and the plurality of images may be performed prior to stitching the source image and the plurality of images arranged in the determined spatial order. Another method for processing of images is explained in detail with reference to FIGS. 6A and 6B.

Figure 6A:
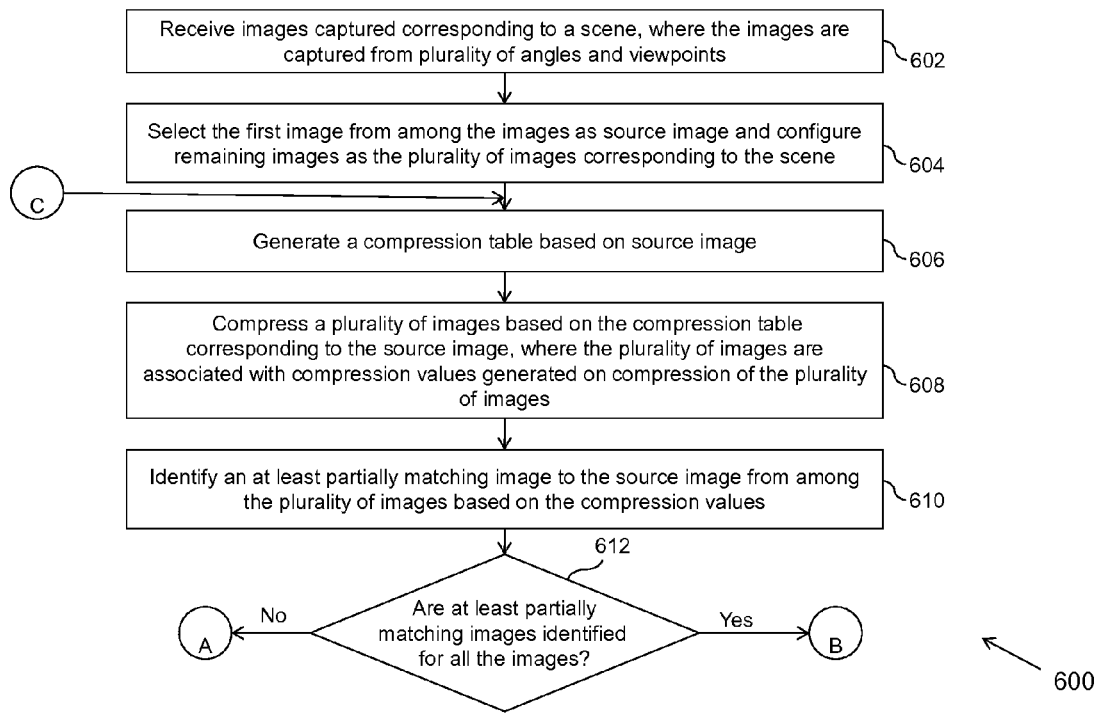
FIGS. 6A and 6B illustrate a flowchart depicting an example method for processing of images in accordance with another example embodiment.
Figure 6B:
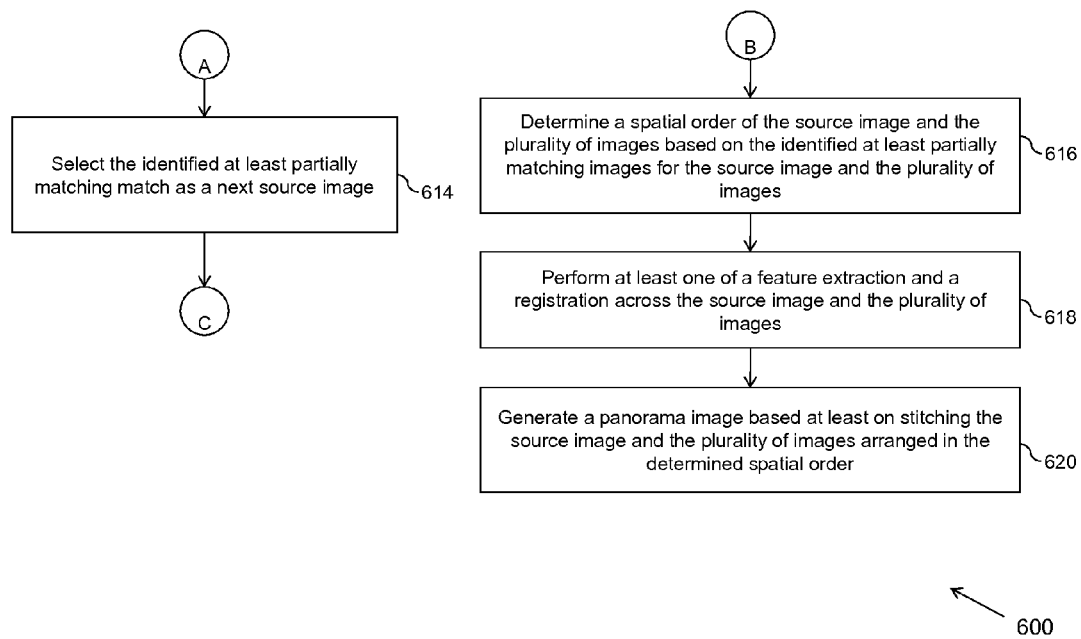

FIGS. 6A and 6B illustrate a flowchart depicting an example method 600 for processing of images in accordance with another example embodiment. The apparatus 200 of FIG. 2 may employ the method 600 for processing of images. At block 602 of method 600, images captured corresponding to a scene are received. The images corresponding to the scene are captured from a plurality of angles and viewpoints. In an example embodiment, the images may be received from an image sensor, such as the image sensor 208. In an embodiment, the image sensor may be spanned through 360 degrees during capturing the images corresponding to the scene. At block 604, a first image from among the received images is selected as the source image. The remaining images from the received images may configure the plurality of images.

At block 606, a compression table is generated based on the source image. As explained in FIG. 2, features may be extracted from the source image and quantized to generate a plurality of codes. The source image may be compressed based on the plurality of codes to generate the compression table. In an embodiment, lossless compression schemes, such as LZW compression scheme, may be utilized for compressing the source image based on the plurality of codes to generate the compression table.

At block 608, a plurality of images is compressed based on the compression table corresponding to the source image. Each image of the plurality of images is associated with a compression value generated on compression based on the source image. At block 610, an at least partially matching image to the source image is identified from among the plurality of images based on the compression values. In an example embodiment, an image with a highest compression value from among the compression values may be identified as an at least partially matching image to the next source image. The identification of the at least partially matching image to the source image may be performed as explained in FIG. 3.

At block 612, it is checked whether at least partially matching images are identified for all the images. If it is determined that at least partially matching images are not identified for all the images then, at block 614, the identified at least partially matching image is selected as the next source image. The operations performed at the blocks 606, 608, 610 and 612 are repeated till at least partially matching images for all the plurality of images. If it is determined that at least partially matching images are identified for all the images then, at block 616, then a spatial order of the source image and the plurality of images is determined based on the identified at least partially matching images for the source image and the plurality of images. The determination of the spatial order may be performed as explained in FIG. 4.

At block 618, at least one of a feature extraction and a registration across the source image and the plurality of images are performed. In an example embodiment, the feature extraction and registration may be performed across an image (for example, source image or next source image) and the corresponding at least partially matching image. The feature extraction of an image and at least partially matching image may be performed using algorithms such as scale-invariant feature transform (SIFT), Harris corner detector, smallest univalue segment assimilating nucleus (SUSAN) corner detector, features from accelerated segment test (FAST). Alternatively, extracting the features may be performed by applying one of DCT, DST, KLT transform and a Hadamard transform on macroblocks corresponding to the image and the corresponding at least partially matching image. In an example embodiment, the DCT is applied on macroblocks corresponding to the image and the corresponding at least partially matching image and the DC components thus obtained may be treated as features. In an embodiment, the DC components may be obtained by partially decoding the source image and the plurality of images.

In an example embodiment, two-dimensional (2D) and three-dimensional (3D) image stabilization algorithms may be employed for performing the registration. In an embodiment, the 2D algorithms may estimate camera motion in the 2D image plane motion and zoom or crop to compensate. The motion may be evaluated in a variety of ways, including optical flow, stable feature points, and block-based cross-correlation. In an embodiment, 3D video stabilization algorithms may identify stable 3D feature points by structure-from-motion and apply image based or warping techniques to cope with parallax effect.

At block 620, a panorama image is generated based at least on stitching the source image and the plurality of images arranged in the determined spatial order. In an example embodiment, the stitching the source image and the plurality of images arranged in the determined spatial order may involve performing at least one of warping and blending of images to generate the panorama image. Warping, for example alignment may be performed in order to obtain an image in view of other image. This may be done as the two images, even though capturing the same scene may capture the information with slight difference on account of difference in an angle of capture. Accordingly, alignment of pixels may be performed to obtain the view of one image in terms of other image. Accordingly, a warp may be computed to obtain one image in the view of the other image. In some embodiments, warping may involve performing interpolation for example, bilinear interpolation. In an example embodiment, the warp may be computed as an 8 parameter transform (for example, using standard techniques, such as similarity, homography, affine and the like) or may be computed using a dense correspondence computed for a stereo camera. In an example embodiment, the warped images may be stitched by computing a seam between the images and blending the images across the seam. The image blending techniques may involve cross-fading or morphing across transitions.

To facilitate discussion of the methods 500 and/or 600 of FIGS. 5, 6A and 6B, certain operations are described herein as constituting distinct steps performed in a certain order. Such implementations are exemplary and non-limiting. Certain operation may be grouped together and performed in a single operation, and certain operations can be performed in an order that differs from the order employed in the examples set forth herein. Moreover, certain operations of the methods 500 and/or 600 are performed in an automated fashion. These operations involve substantially no interaction with the user. Other operations of the methods 500 and/or 600 may be performed by in a manual fashion or semi-automatic fashion. These operations involve interaction with the user via one or more user interface presentations.

Without in any way limiting the scope, interpretation, or application of the claims appearing below, a technical effect of one or more of the example embodiments disclosed herein is to perform processing of images. As explained in FIGS. 2-6B, the processing of images may involve enable identifying at least partially matching images, for example close neighbors/adjacent images from a set of images of scene taken at various angles and viewpoints, which may be used sequentially to stitch and create a 1D or multi-row (2D) panoramic view (complete picture of the scene covering the maximum of angle of 360 degree view) of a scene. The identification of close neighbors in such a manner precludes the need to perform explicit registration of images and in general provides a fast and robust technique for automatic and sequential panorama generation. Further, a user may provide the choice of a source image and identify a closest matching match from among the plurality of images on the web. In an embodiment, identifying at least partially matching images may help in retrieving similar images from a large collection of images, help remove duplicates thereby facilitating faster browsing and better utilization of storage space.

Various embodiments described above may be implemented in software, hardware, application logic or a combination of software, hardware and application logic. The software, application logic and/or hardware may reside on at least one memory, at least one processor, an apparatus or, a computer program product. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of an apparatus described and depicted in FIGS. 1 and/or 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications, which may be made without departing from the scope of the present disclosure as defined in the appended claims.

We claim:

1. A method comprising:
facilitating receipt of a source image;
compressing a plurality of images based on the source image, wherein the plurality of images are associated with compression values generated on compression of the plurality of images;
identifying an at least partially matching image to the source image from among the plurality of images based on the compression values;
selecting the identified at least partially matching image as a next source image;
compressing remaining images of the plurality of images based on the next source image, wherein the remaining images are associated with compression values generated on compression of the remaining images; and
identifying an at least partially matching image to the next source image from among the remaining images based on the compression values.

2. The method as claimed in claim 1, further comprising:
identifying at least partially matching images for the remaining images of the plurality of images.

3. The method as claimed in claim 1, further comprising:
determining a spatial order of the source image and the plurality of images based on the identified at least partially matching images for the source image and the plurality of images; and
generating a panorama image based at least on stitching the source image and the plurality of images arranged in the determined spatial order.

4. The method as claimed in claim 3, wherein determining the spatial order of the plurality of images comprises comparing compression values associated with an image on compression based on the source image and selected one or more next source images.

5. The method as claimed in claim 3, further comprising:
performing at least one of a feature extraction and a registration across the source image and the plurality of images prior to stitching the source image and the plurality of images arranged in the determined spatial order.

6. The method as claimed in claim 1, wherein the at least partially matching image is identified based on a highest compression value from among the compression values.

7. The method as claimed in claim 1, wherein the source image and the plurality of images correspond to images captured corresponding to a scene and comprise overlapping image portions or regions.

8. The method as claimed in claim 1, wherein compressing the plurality of images based on the source image further comprises:
extracting features from the source image, wherein the features are capable of characterizing the source image;
quantizing the extracted features to create a plurality of codes corresponding to the source image; and
generating a compression table by compressing the source image based on the plurality of codes, wherein the plurality of images is compressed based on the generated compression table corresponding to the source image.

9. An apparatus comprising:
at least one processor; and
at least one memory comprising computer program code, the at least one memory and the computer program code configured to, with the at least one processor, cause the apparatus to at least perform:
facilitate receipt of a source image;
compress a plurality of images based on the source image, wherein the plurality of images are associated with compression values generated on compression of the plurality of images;
identify an at least partially matching image to the source image from among the plurality of images based on the compression values;
wherein to compress the plurality of images based on the source image, the apparatus is further caused, at least in part to:
extract features from the source image, wherein the features are capable of characterizing the source image;
quantize the extracted features to create a plurality of codes corresponding to the source image; and
generate a compression table by compressing the source image based on the plurality of codes, wherein the plurality of images is compressed based on the generated compression table corresponding to the source image.

10. The apparatus as claimed in claim 9, wherein the apparatus is further caused, at least in part, to:
select the identified at least partially matching image as a next source image;
compress remaining images of the plurality of images based on the next source image, wherein the remaining images are associated with compression values generated on compression of the remaining images; and
identify an at least partially matching image to the next source image from among the remaining images based on the compression values.

11. The apparatus as claimed in claim 10, wherein the apparatus is further caused, at least in part, to:
identify at least partially matching images for the remaining images of the plurality of images.

12. The apparatus as claimed in claim 11, wherein the apparatus is further caused, at least in part, to:
determine a spatial order of the source image and the plurality of images based on the identified at least partially matching images for the source image and the plurality of images; and
generate a panorama image based at least on stitching the source image and the plurality of images arranged in the determined spatial order.

13. The apparatus as claimed in claim 12, wherein determining the spatial order of the plurality of images comprises comparing compression values associated with an image on compression based on the source image and selected one or more next source images.

14. The apparatus as claimed in claim 12, wherein the apparatus is further caused, at least in part, to:
perform at least one of a feature extraction and a registration across the source image and the plurality of images prior to stitching the source image and the plurality of images arranged in the determined spatial order.

15. The apparatus as claimed in claim 9, wherein the at least partially matching image is identified based on a highest compression value from among the compression values.

16. The apparatus as claimed in claim 9, wherein the source image and the plurality of images correspond to images captured corresponding to a scene and comprise overlapping image portions or regions.

17. A non-transitory computer-readable medium embodying a computer program comprising a set of instructions, which, when executed by one or more processors, cause an apparatus to at least perform:
   facilitate receipt of a source image;
   compress a plurality of images based on the source image, wherein the plurality of images are associated with compression values generated on compression of the plurality of images;
   identify an at least partially matching image to the source image from among the plurality of images based on the compression values;
   select the identified at least partially matching image as a next source image;
   compress remaining images of the plurality of images based on the next source image, wherein the remaining image are associated with compression values generated on compression of the remaining images; and
   identify an at least partially matching image to the next source image from among the remaining images based on the compression values.

* * * * *